(12) United States Patent
Henderson

(10) Patent No.: US 9,592,970 B2
(45) Date of Patent: Mar. 14, 2017

(54) ROBOTIC GANTRY WITH END EFFECTOR FOR PRODUCT LIFTING

(76) Inventor: Toby D. Henderson, Rockford, IL (US)

( * ) Notice: Subject to any disclaimer, the term of this patent is extended or adjusted under 35 U.S.C. 154(b) by 2106 days.

(21) Appl. No.: 12/505,129

(22) Filed: Jul. 17, 2009

(65) Prior Publication Data

US 2010/0014954 A1    Jan. 21, 2010

Related U.S. Application Data

(60) Provisional application No. 61/081,412, filed on Jul. 17, 2008.

(51) Int. Cl.
| | | |
|---|---|---|
| B65G 47/04 | (2006.01) | |
| B65G 57/00 | (2006.01) | |
| B25J 9/02 | (2006.01) | |
| B65G 61/00 | (2006.01) | |
| B65G 57/24 | (2006.01) | |

(52) U.S. Cl.
CPC ............ *B65G 61/00* (2013.01); *B65G 57/24* (2013.01)

(58) Field of Classification Search
USPC .......... 294/67.3, 67.33, 81.54; 414/621, 623, 414/626, 788.9, 789.3, 789.8, 789.9, 414/790.2, 791.6, 792.6, 792.9, 793.4, 414/793.5, 794, 796.2, 796.3, 796.9, 414/797.2, 799, 900, 922, 924
See application file for complete search history.

(56) References Cited

U.S. PATENT DOCUMENTS

| | | | | |
|---|---|---|---|---|
| 4,032,021 A | * | 6/1977 | Mabey et al. | 414/796.8 |
| 5,051,058 A | * | 9/1991 | Roth | 414/789.1 |
| 5,088,878 A | * | 2/1992 | Focke et al. | 414/627 |
| 5,222,857 A | * | 6/1993 | Hasegawa | 414/788.4 |
| 5,984,620 A | * | 11/1999 | Heston | 414/791.6 |
| 6,003,917 A | * | 12/1999 | Tygard | 294/87.1 |
| 6,658,816 B1 | * | 12/2003 | Parker et al. | 53/397 |
| 2005/0265817 A1 | * | 12/2005 | Blanc | 414/799 |

FOREIGN PATENT DOCUMENTS

| | | | | |
|---|---|---|---|---|
| DE | 4206038 A1 | * | 9/1993 | |
| EP | 1724219 A2 | * | 11/2006 | |
| EP | 1908709 A1 | * | 4/2008 | B65G 57/24 |
| JP | 05270513 A | * | 10/1993 | |
| WO | WO 2007062778 A1 | * | 6/2007 | B65G 57/24 |
| WO | WO 2007131668 A1 | * | 11/2007 | |

* cited by examiner

*Primary Examiner* — Gregory Adams
(74) *Attorney, Agent, or Firm* — Hamilton IP Law, PC; Jay R. Hamilton; Charles D. Damschen

(57) ABSTRACT

A robotic gantry system, end-effector for a robotic gantry system and method of transporting products using a robotic gantry system is provided. The end-effector includes a movable floor that can be positioned below picked products to prevent products from being dropped during transport. The movable floor also permits selecting individual rows of products from a given layer of products of a product stack. The end-effector may include a vacuum assembly for vacuum adhering to the products. The method permits selection of varying portions of a stack of products with the end-effector and protecting the selected portions of products using the movable floor.

14 Claims, 15 Drawing Sheets

ROBOTIC GANTRY WITH END EFFECTOR FOR PRODUCT LIFTING

CROSS-REFERENCE TO RELATED PATENT APPLICATIONS

This patent application claims the benefit of U.S. Provisional Patent Application No. 61/081,412, filed Jul. 17, 2008, the disclosure and teachings of which are incorporated herein, in their entireties, by reference.

FIELD OF THE INVENTION

This invention generally relates to product distribution systems and more particularly product distribution systems within a warehouse.

BACKGROUND OF THE INVENTION

In today's market place, retail goods are often mass produced then shipped in bulk to central warehouses prior to being distributed to individual local retail establishments.

The retail goods may be shipped in bulk on large pallets to the central warehouses. For example, a pallet of numerous cases of individual products such as, for example, bottles or cans of beverages. The cases will be stacked in several layers on the pallets. For example, a pallet of cases may include a single layer of cases that is five cases wide along each side for a total of twenty five cases per layer. The pallet may include five or six layers of cases. As such, a single pallet my include approximately 125 to 150 cases of products.

At the central warehouses, the bulk pallets may or may not be broken down into smaller units of cases to be delivered to the individual retail establishments. For example, a local retail establishment may order high volume items by the full pallet, but smaller volume items by partial pallets. Further, a retail establishment may order hundreds of different items.

Unfortunately, it can be very time consuming and labor intensive to manually organize and prepare the individual orders for each of the different retail establishments.

Some attempts have been made to create picking devices that will pick layers of product from a pallet and then move them to a different location where an individual order is being filled. These devices typically require squeezing the items together from the outer rows of items. As such, the outer rows of items press into the inner rows of items when the layer is lifted. It is the pressure between the outer rows and adjacent inner rows that allows for lifting the entire layer.

Unfortunately, the configuration of the packaging for many items prevents good pressing of the various adjacent rows into one another resulting in loose items in the layer. The loose items will fall out of the layer when lifted by the picking device creating instability in the pressure which will ultimately result in the entire layer of product falling out from the grasp of the picking device.

Further yet, prior picking devices typically could only pick full layers of items. Unfortunately, if a retailer only wanted a partial layer of items, the picking device could not be used for such selection of items. For example, if a retailer only wanted 15 cases of one type of beverage from a pallet identified above, the picking device could not fill that order because the picking device could not get between the various rows to only take 3 rows of cases.

There exists, therefore, a need in the art for an improved lifting system. The invention provides improvements over prior lifting system for picking products from a pallet in full or partial pallet quantities.

BRIEF SUMMARY OF THE INVENTION

The present invention has several aspects that may be claimed and stand as patentable independently and individually or in combination with other aspects, including but not limited to the following.

In one aspect, an embodiment of the invention provides an end-effector for a robotic system comprising a frame structure, first and second product engagement structure and a floor. The first product engagement structure is mounted to and movable relative to the frame structure. The first product engagement structure is movable toward and away from the second product engagement structure along a first axis. The floor is moveable relative to the frame structure and the first and second product engagement structures to cover a gap formed between the first and second product engagement structures.

In another aspect, an embodiment of the invention provides a robotic system including an end-effector and a gantry system. The end-effector includes a frame structure, first and second product engagement structures and a floor. The first product engagement structure is mounted to and movable relative to the frame structure. The first product engagement structure movable toward and away from the second product engagement structure along a first axis. The floor is moveable relative to the frame structure and the first and second product engagement structures. The gantry system is configured to move the end-effector in three dimensions.

In alternative embodiments, a pedestal robot can be used to control and support the end-effector.

In one implementation of the robotic system above, the gantry system and end-effector are configured for movement of the frame structure along a second axis while a leading edge of the floor remains stationary relative to the second axis.

In another implementation of the end-effector or robotic system, the end-effector may include a vacuum pad assembly for providing suction or vacuum grasping capabilities to the end-effector. The vacuum pad assembly provides a suction force to grasp the tops of products forming the top layer of products on a pallet. This vacuum grasping allows for improved picking of products that have odd shapes that would normally become loose if merely grasped by providing lateral loading forces by clamping plates.

In yet another aspect, an embodiment of the invention provides a method of transporting at least one product of a stack of products on a pallet with a robotic system including an end-effector having a movable floor. The method includes removing at least one product from the stack of products and transitioning the movable floor under the at least one product. Depending on the implementation, these steps may occur simultaneously or sequentially.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

While embodiments of the invention may be described in relation to moving products in the beverage industry, the present invention finds utility and applicability in product distribution centers distributing any type of product, beyond beverages.

Figure 1:
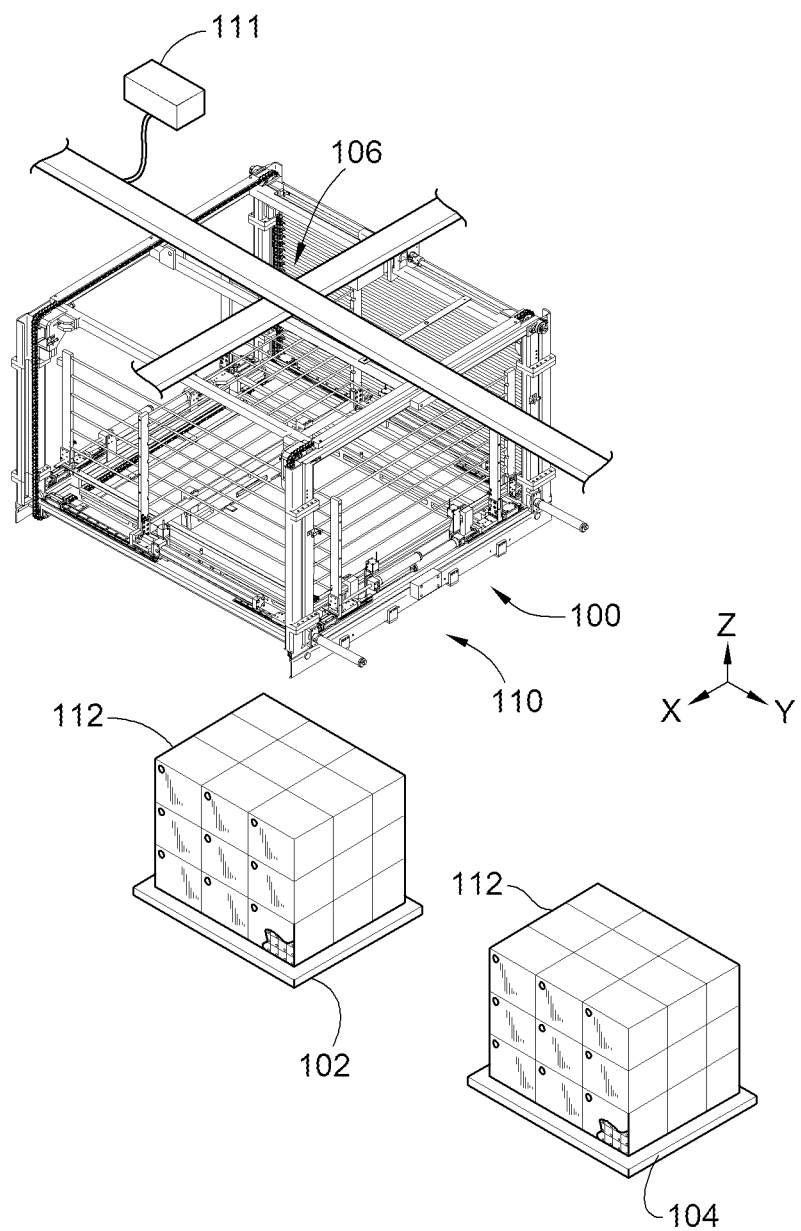
FIG. 1 is an exemplary embodiment of a robotic gantry system in accordance with the teachings of the present invention.

FIG. 1 is a simplified perspective illustration of a robotic system 100 for automatically loading and unloading pallets 102, 104. The robotic system 100 includes gantry system 106 for positioning an end-effector 110 in three dimensions along an x-axis, y-axis and z-axis that are preferably orthogonal to one another. The robotic system 100 further includes a controller 111 for controlling the movement and operations of the end-effector 110 and gantry system 106. While the end-effector 110 is coupled to a gantry system 106, other robotic systems can be used to control the position of the end-effector 110. For example, a pedestal robot could be used to support and position end-effector 110. More particularly, a 5-axis or 6-axis pedestal robot could be used to support and position end-effector 110.

As will be more fully developed below, the end-effector 110 is sized to receive the products 112 stacked on the pallets 102, 104 therein through a product opening and to pick various rows and layers of the products 112 such that the products 112 can be moved to different locations or pallets.

As one particular implementation of the robotic system 100 is in distribution warehouses and, more particularly, beverage distribution warehouses, the products 112 may also be referred to herein as cases. However, it should be noted that the teachings of the present invention can be applied to warehouses and robotic systems for loading and distributing other types of products.

The representative pallets 102, 104 are stacked with a stack of products that includes three layers. Each layer is formed by nine individual cases arranged in three rows of three cases. Thus, the pallets 102, 104 are loaded with twenty-seven cases. However, the robotic system 100 of the present invention may be used with pallets having any number of products.

Figure 2:
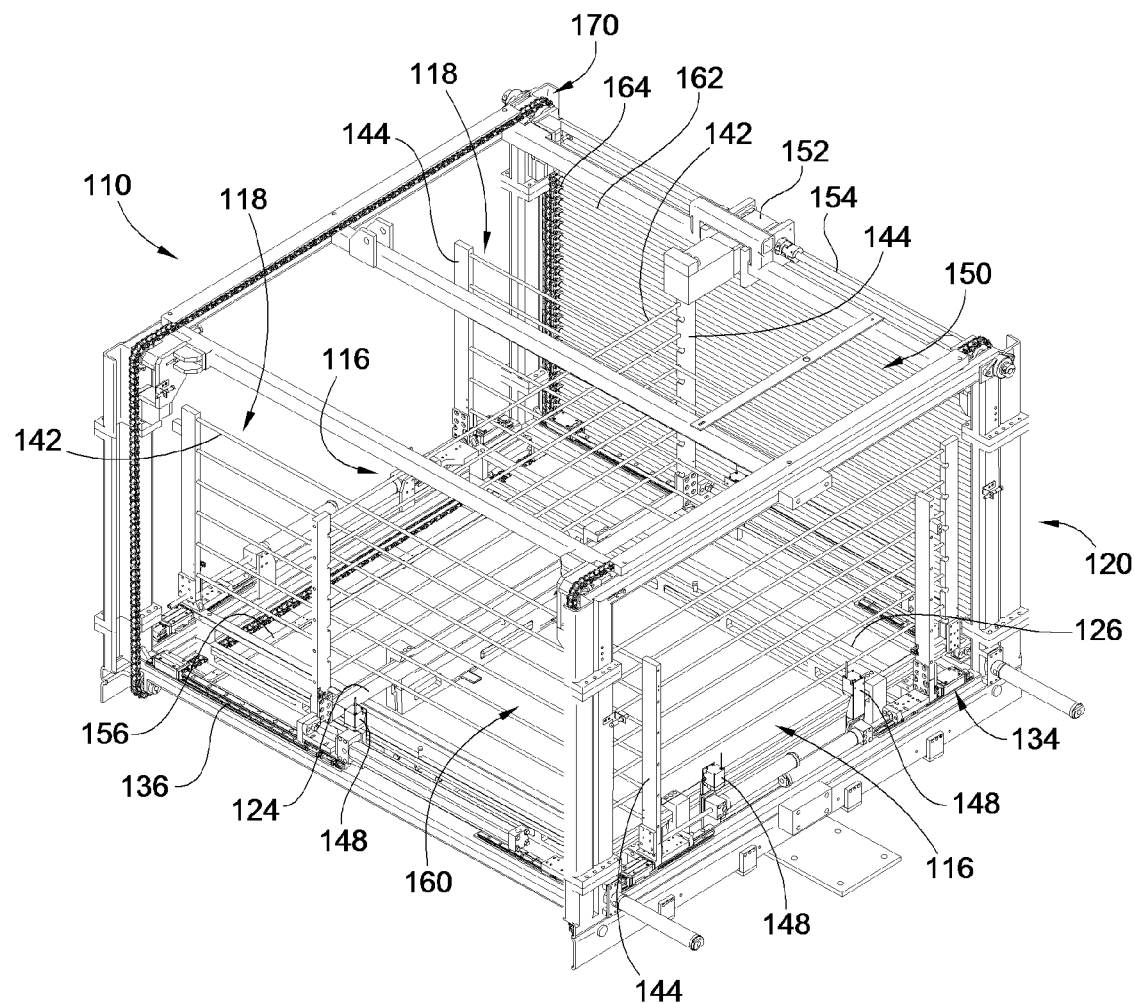
FIG. 2 is a partial perspective illustration of an end-effector of the robotic gantry system with the rolling floor positioned in a down position.

FIG. 2 illustrates a partial perspective illustration of an embodiment of an end-effector 110 for the robotic system for picking or placing products 112 from or on a pallet 102, 104. As will be more fully developed below, the end-effector 110 can be used to pick all the products from a full pallet (i.e. full pallets) or pick some of the products from a pallet (i.e. partial pallets). Further yet, when picking partial pallets, the end-effector 110 can be used to pick multiple layers of products or only a portion of a layers of products (e.g. a single row or multiple rows of products).

The end-effector 110 includes a plurality of clamping mechanisms 116, 118 that are mounted to a frame structure 120 for move relative to one another. The clamping mechanisms 116, 118 position, clamp or a combination of position and clamp products 112 so that the products 112 can be lifted from the pallets 102, 104 and then transported to another location. The clamping mechanisms 116, 118 may interact to align the products 112 more closely to a rectangular shape to assist in grasping the products.

A preferred end-effector 110 includes a pair of opposed clamping mechanisms similar to clamping mechanism 116 and a pair of opposed clamping mechanisms similar to clamping mechanism 118.

The clamping mechanisms of a given pair preferably move toward and away from one another while remaining generally parallel to each other. This assists in aligning the products and providing for improved grasping. The pairs of clamping mechanisms move along orthogonal axis relative to one another. For example, clamping mechanisms 116 may move along the y-axis, while clamping mechanisms 118 may move along the x-axis.

Figure 4:
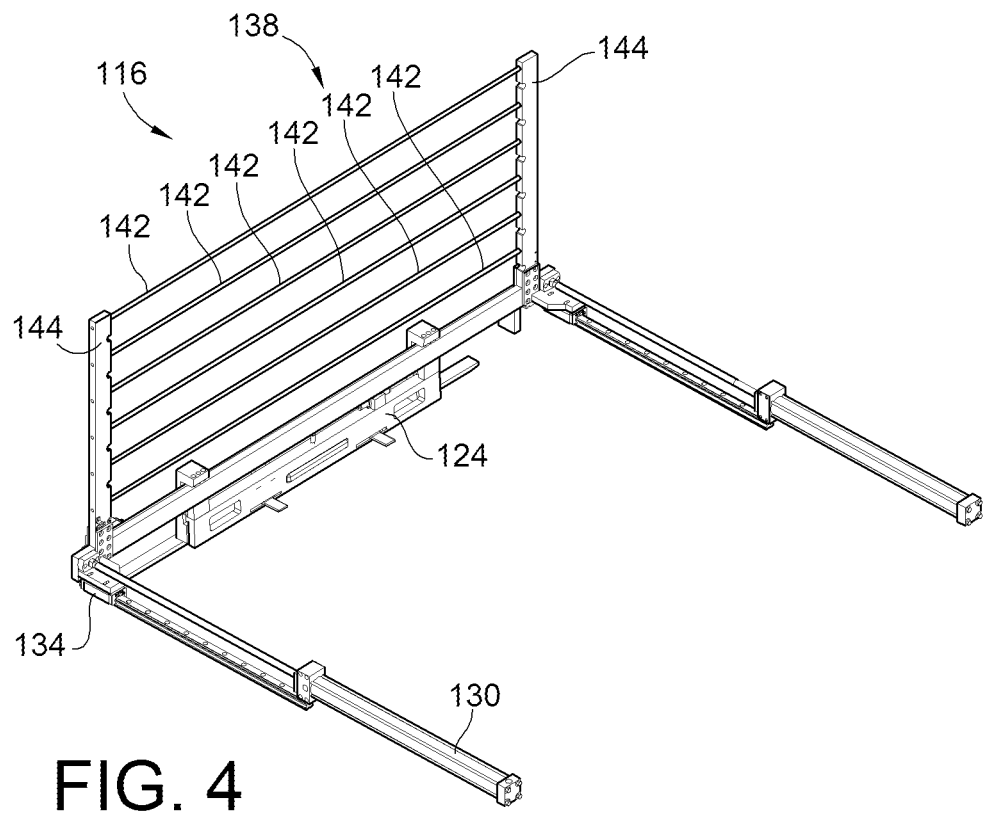
FIGS. 4 and 5 are partial perspective illustrations of clamping mechanisms of the end-effector of FIG. 2.
Figure 5:
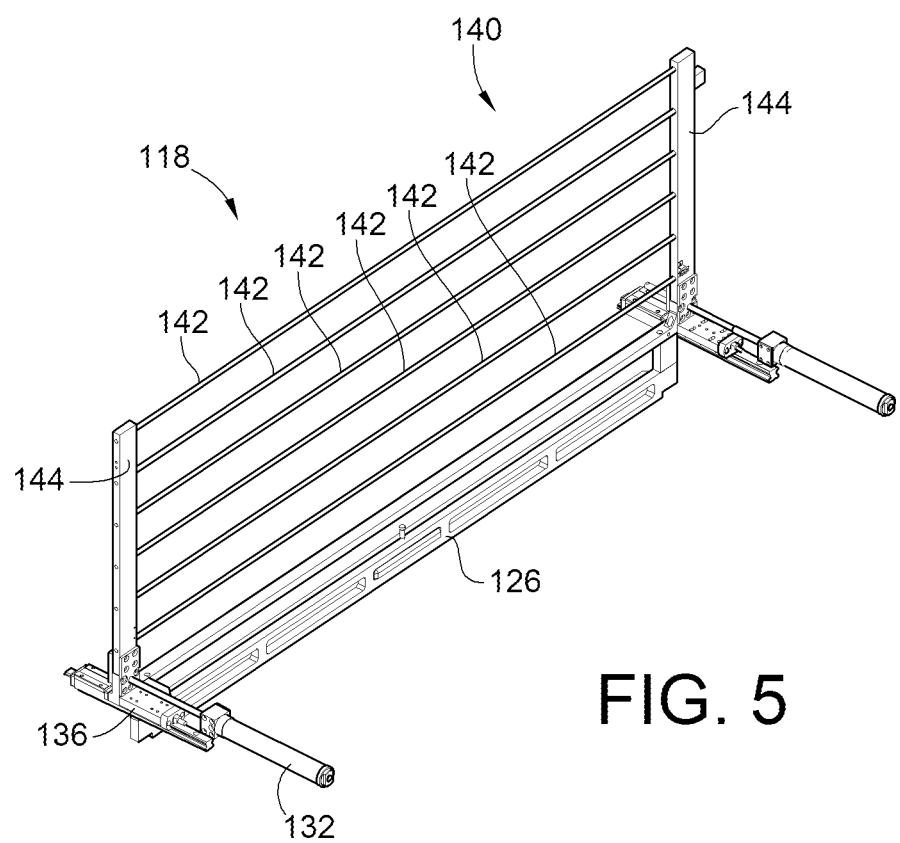

FIGS. 4 and 5 are simplified perspective illustrations of individual ones of the clamping mechanisms 116, 118. The clamping mechanisms 116, 118 include product engagement structures in the form of clamping plates 124, 126, respectively, for positioning and grasping the products. When picking products, the opposed clamping mechanisms 116, 118 of the end-effector 110 move toward one another such that the clamping plates 124, 126 clamp the products therebetween. Depending on the implementation, the products may be clamped (i.e. grasped) between a single pair of clamping mechanisms such as clamping mechanisms 116 or clamping mechanisms 118. Alternatively, all four clamping mechanisms 116, 118 may be used to grasp the products.

Further yet, prior to fully grasping the products, the clamping mechanisms 116, 118, and particularly, clamping plates 124, 126 may be used to align the products in a generally rectangular grid.

The clamping mechanisms 116, 118 further include linear actuators 130, 132 at opposite ends of the clamping plates 124, 126 to position the clamping plates 124, 126 relative to one another and the frame structure 120. The linear actuators 130, 132 may be hydraulic, pneumatic, servo-operated, screw driven, belts and pulleys, etc. Alternative configurations may include only a single linear actuator dedicated to a clamping plate or may have a single linear actuator or a pair of linear actuators coupled between opposed ones of the clamping plates so that each one of the opposed pair of clamping plates does not have one or more dedicated linear actuator(s).

The clamping plates 124, 126 ride on and are guided by linear bearings 134, 136 to provide smooth operation and guided movement. The linear bearings 134, 136, as illustrated in FIG. 2, operably mount the clamping plates 124, 126 to frame structure 120.

The clamping mechanisms 116, 118 further include guide panels 138, 140 that prevent any products from falling out of the end-effector 110 during transport. More particularly, the guide panels 138, 140 help surround products that form higher layers on the pallets that are not directly clamped by the clamping plates 124, 126 that may shift due to accelerations, decelerations and changes in direction during transport.

Figure 6:
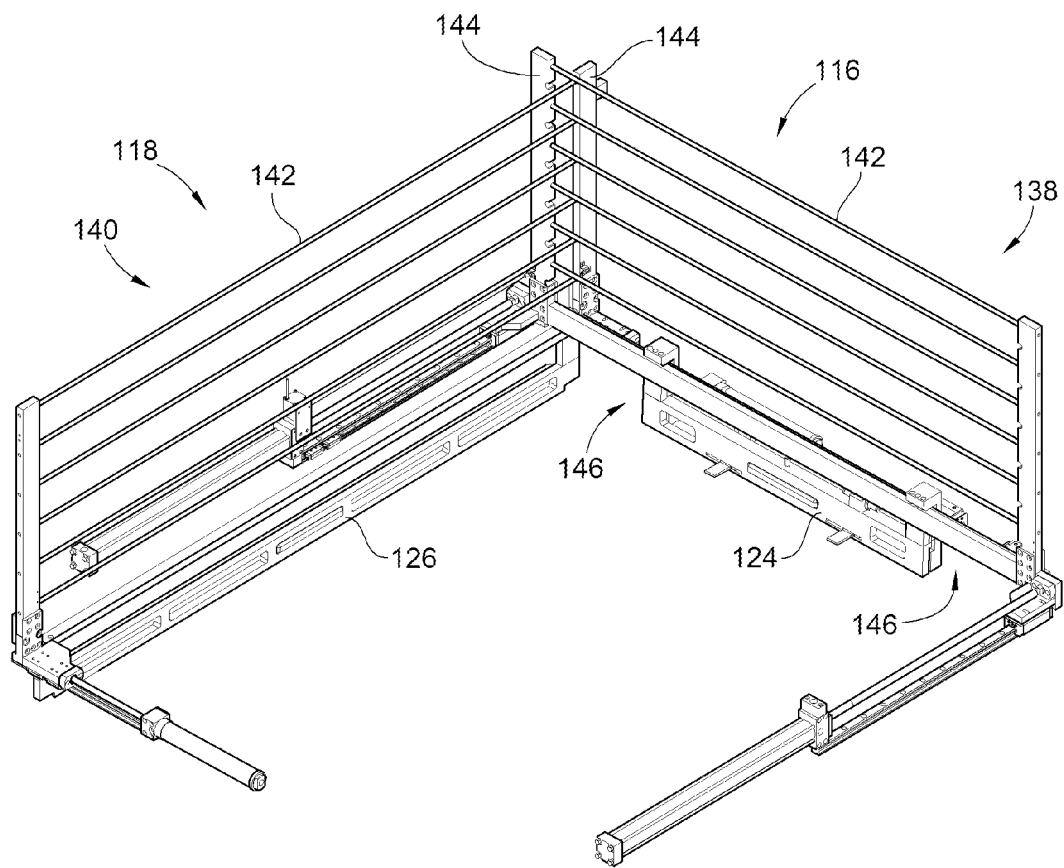
FIG. 6 is a partial perspective illustration of the clamping mechanisms of FIGS. 4 and 5 with the clamping mechanisms positioned relative to one another.

The guide panels 138, 140 are formed by horizontal bars 142 mounted between and to vertical support bars 144. The guide panels 138, 140 are preferably long enough such that the horizontal bars 142 of adjacent ones of the guide panels 138, 140 pass through the adjacent guide panels 138, 140 to inter-lace the adjacent guide panels 138, 140 (see FIG. 6). This configuration can provide for additional support to the guide panel 138, 140 in the event that a product 112 does press against the guide panels 138, 140. This configuration also prevents the guide panels 138, 140, and particularly vertical support bars 144, from colliding into one another as the clamping mechanisms 116, 118 move relative to one another to pick and place products 112.

Clamping plates 124, 126 preferably interlace, much like the guide panels 138, 140. As such, clamping plate 124 has voids 146 on opposite ends. These voids provide space for clamping plates 126 to move laterally toward one another without colliding with clamping plate 124 while maintaining clamping plates 124, 126 generally aligned with one another in a common plane.

Referring to FIG. 2, the end-effector 110 further includes positioning sensors 148 for monitoring the position of the clamping mechanisms 116, 118 and particularly clamping plates 124, 126. The positioning sensors 148 may take any form, such as for example, electric eyes, cable actuated position sensors or pressure sensors. Further yet, the linear bearings 134, 136 could include position sensors for determining the location of the clamping plates 124, 126.

While not shown, the clamping mechanisms 116, 118 may include load cells or other force measuring devices for monitoring the clamping force applied by the clamping plates 124, 126. The clamping mechanisms 116, 118 may also include sensors for detecting engagement with the products, such as buttons or switches that actuate when the clamping plates 124, 126 become sufficiently close to the products. Further, load cells may be positioned between the end-effector 110 and the gantry system 106 for monitoring the weight of products being lifted by the end-effector 110.

Figure 3:
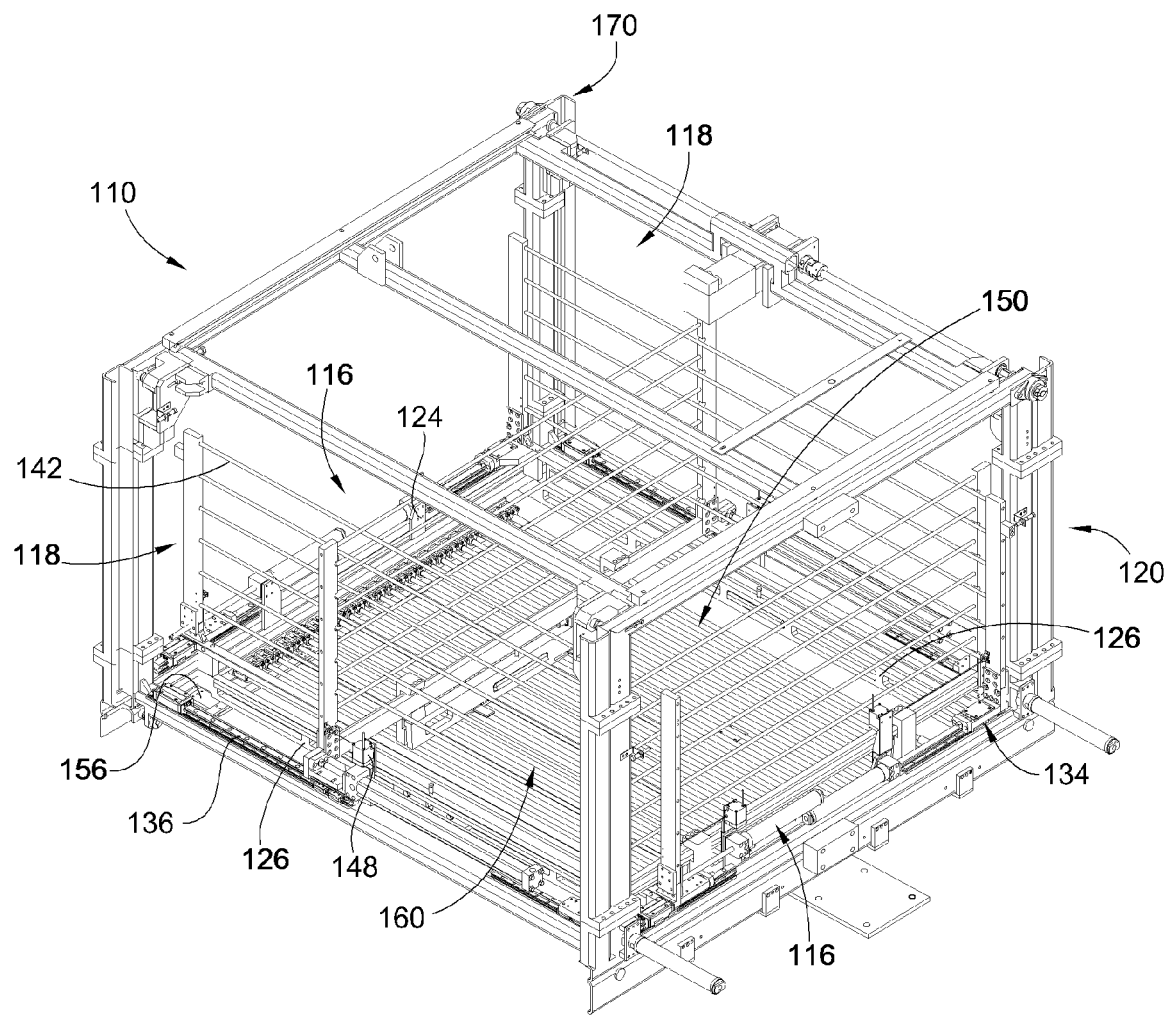
FIG. 3 is a partial perspective illustration of the end-effector of FIG. 2 with the rolling floor positioned in an up position.

With reference to FIGS. 2 and 3, the end-effector 110 includes a rolling floor 150 that prevents products from falling out of the end-effector 110 in the event that products become loose during transport. In the illustrated embodiment, the rolling floor 150 is driven by a motor 152 coupled to a drive shaft 154 that drives a chain (shown in FIG. 2) coupled to the rolling floor 150.

The frame structure 120 includes floor support members 156 (see FIG. 2) that vertically support the rolling floor 150 when the rolling floor 150 is in a down position (see FIG. 3). In the down position, the rolling floor 150 closes the product opening 160 (see FIG. 2) bounded by the clamping mechanisms 116, 118 to prevent dropping loose products.

The rolling floor 150 of the illustrated embodiment is formed by a plurality of floor segments 162 that are coupled to the drive chain. The floor segments 162 include guide rollers 164 at opposite ends that interact with the frame structure 120 to assist in positioning the rolling floor 150. Further, the floor segments 162 preferably include a rolling outer shell formed by a single member or plurality of rolling elements that assist in positioning the floor segments 162 under products that are picked by the end-effector 110.

When the end-effector 110 is about to deliver products, the rolling floor 150 is driven to an open position to expose product opening 160 (See FIG. 2). More particularly, the rolling floor 150 is transitioned to a vertical orientation. The guide rollers 164 of the rolling floor 150 are housed in guide channels 170. Although rolling floor 150 is illustrated in the open or up position on the side proximate motor 152, the rolling floor 150 may be transitioned to a vertical orientation on either side of the end-effector 110.

Now that the structural components of the end-effector 110 have been described, the varying operations of the end-effector 110 will be described.

Figure 7:
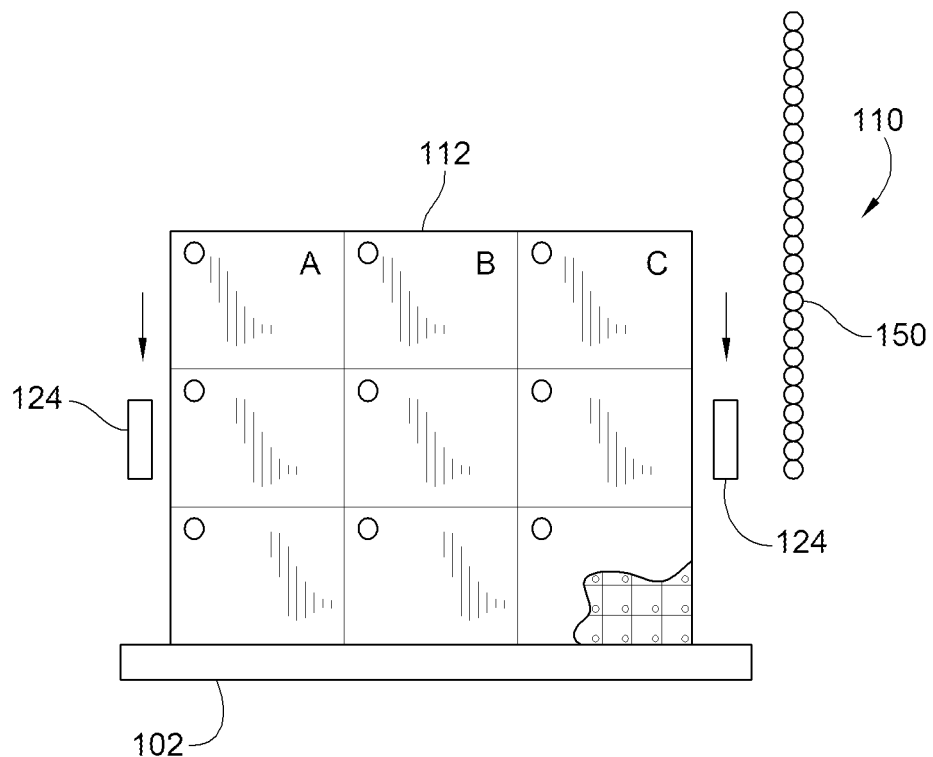
FIGS. 7-18 are schematic representations of the end-effector in various positions and orientations as it goes through various processes of picking products from a stack of products on a pallet.

With reference to schematic illustrations FIGS. 7-10, a first method of operating the end-effector 110 to pick full layers of products will be described. In FIG. 7, the end-effector 110 (illustrated throughout FIGS. 7-18 by clamping plates 124 and rolling floor 150) is positioned vertically relative to a pallet 102 so as to pick the top two layers of products 112. In this position, the clamping plates 124 are spaced apart and away from products 112. The rolling floor 150 is in the open position (also referred to as the "up position").

Figure 8:
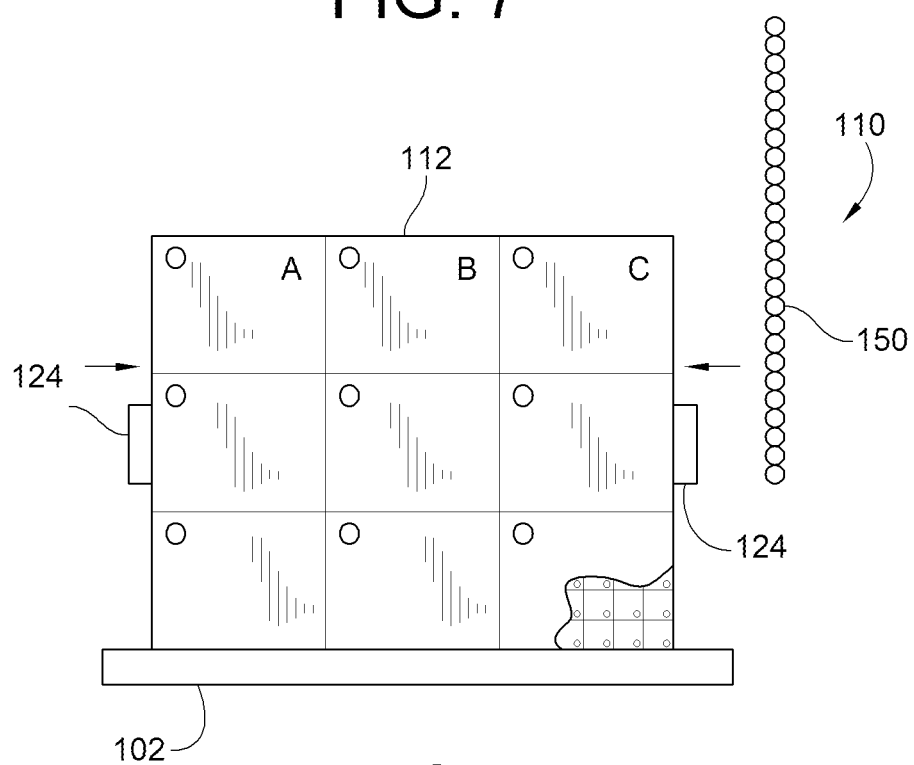
Figure 9:
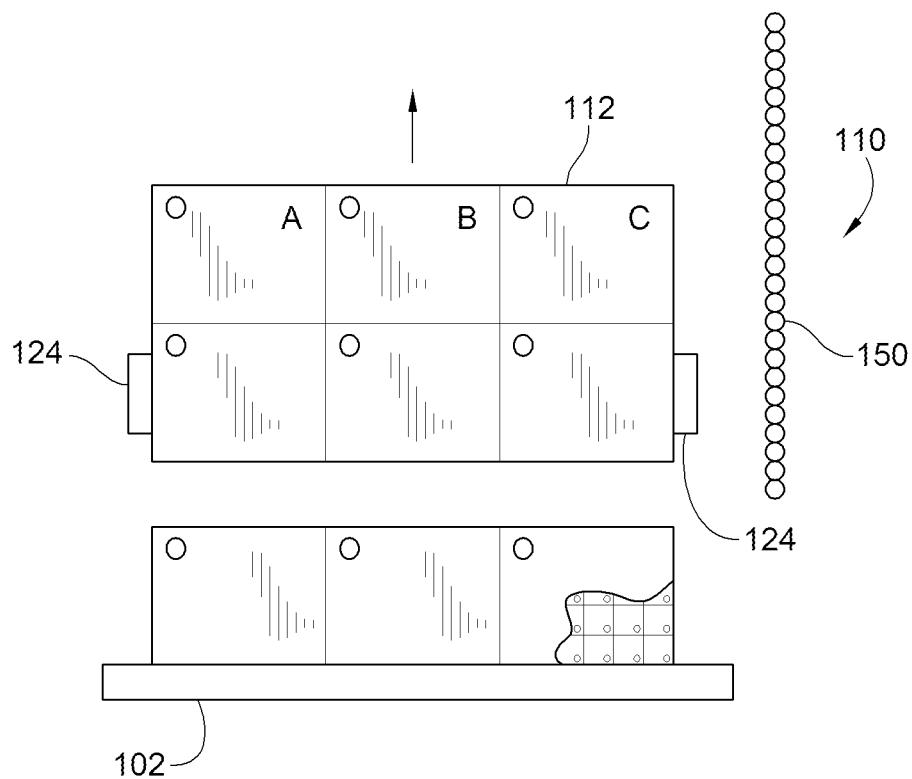
Figure 10:
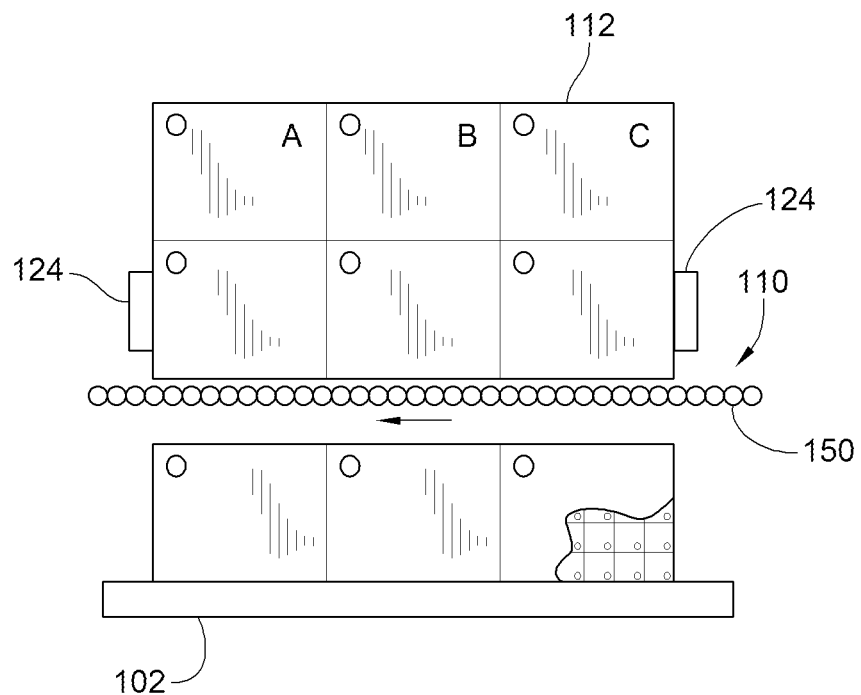

Next, the clamping plates 124 transition toward one another and clamp (i.e. grasp) the second layer of products 112 (See FIG. 8). With the clamping plates 124 pressed laterally inward against the products 112, the end-effector 110 is actuated vertically upward along the z-axis to lift and remove the top two layers of products 112 (See FIG. 9). With the end-effector 110 raised to form a gap between the second layer of products and the bottom layer of products, the rolling floor 150 is transitioned to the closed position (also referred to as the "down position") (See FIG. 10). It should be noted that although a gap is formed between rolling floor 150 and products 112 in FIG. 10, no such gap need be provided. The products may then be moved to the desired location and restacked by repeating the same steps in reverse order. With the rolling floor 150 in the closed position, should any products become loose, they will not fall and be destroyed. Instead, they will remain supported by rolling floor 150.

An alternative set of steps of operation is illustrated in FIGS. 11-15, the products 112 are too "loose" to be lifted (i.e. the products 112 cannot be lifted without the center of the layer falling out). The looseness of the products 112 may be due to the shape of the individual products or cases. Alternatively, the products 112 may be fragile such that sufficient lateral force cannot be applied by the clamping plates 124 to create sufficient friction to permit lifting the products.

In this operation, the products 112 are slid laterally off the stack of products 112 on the pallet 102. This operation will also illustrate the independent feature of being able to pick a different number of layers of products, for example just the first layer.

Figure 11:
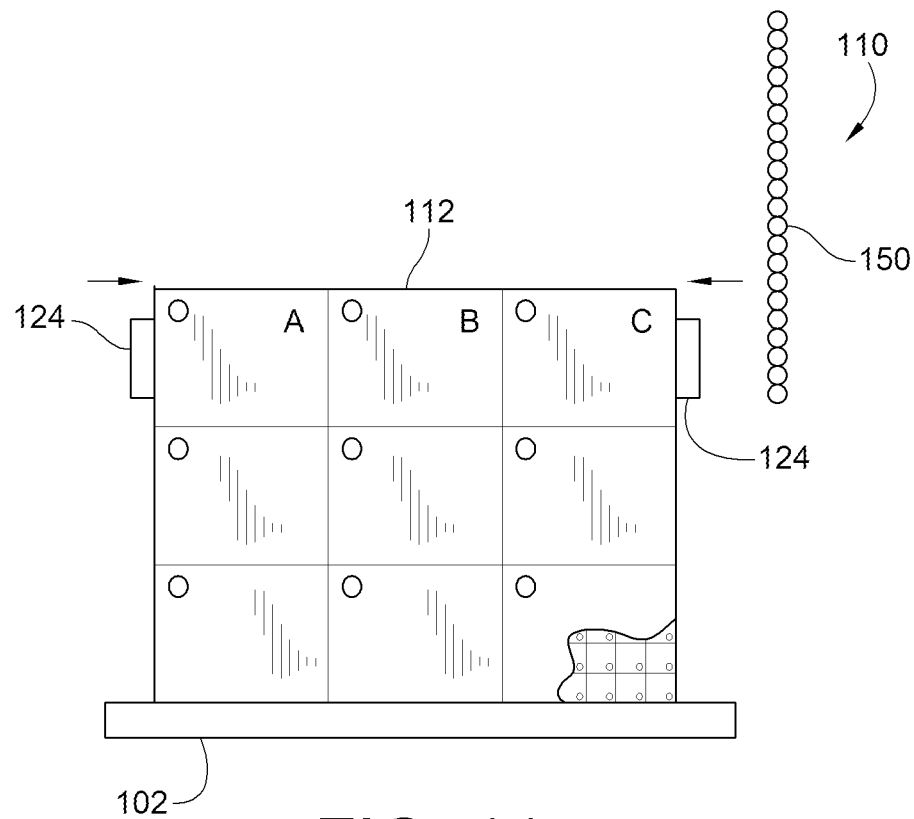
Figure 12:
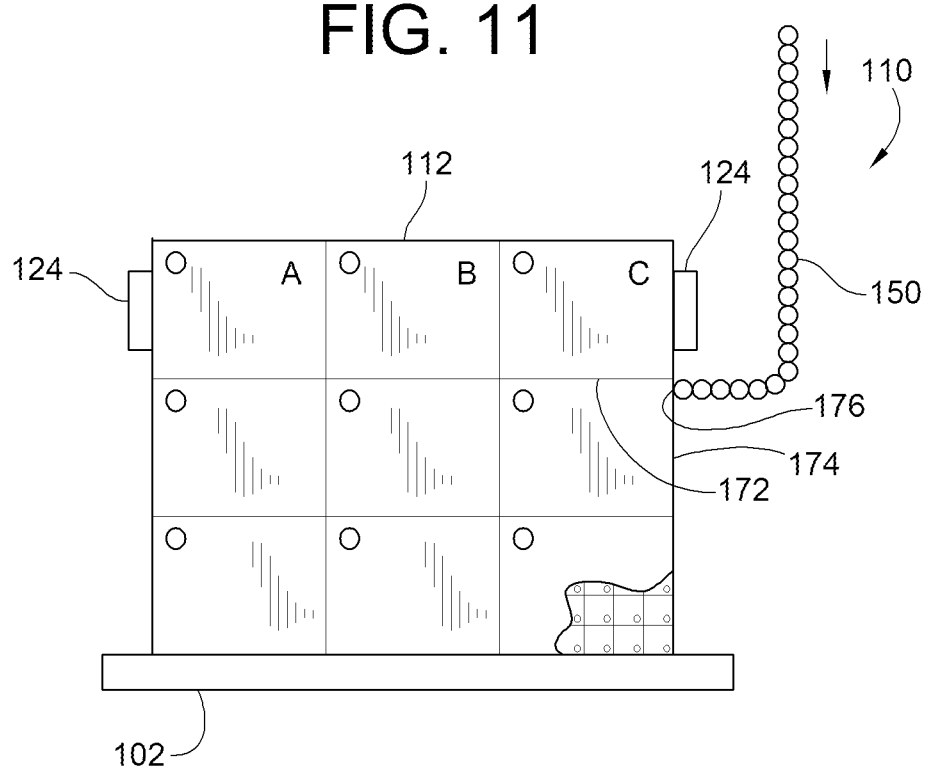

More particularly, with the end-effector 110 positioned vertically aligned with the top layer of products, the clamping plates 124 are moved laterally inward toward one another to engage (i.e. grasp) the products 112 (See FIG. 11). In this method, the rolling floor 150 begins its transition to the down position prior to lifting the products 112. The rolling floor 150 is preferably positioned just below the bottoms 172 of the products 112 and against the side 174 of the outer row of the second layer of products 112 (See FIG. 12). The steps illustrated in FIGS. 11 and 12 can be performed simultaneously or in reverse order.

Figure 13:
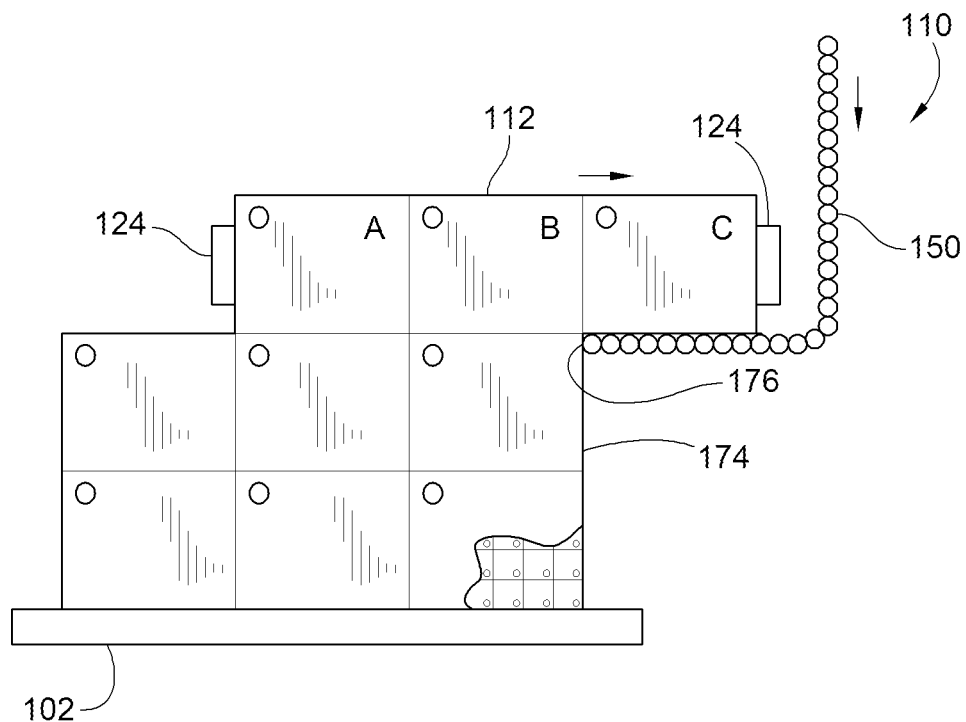
Figure 14:
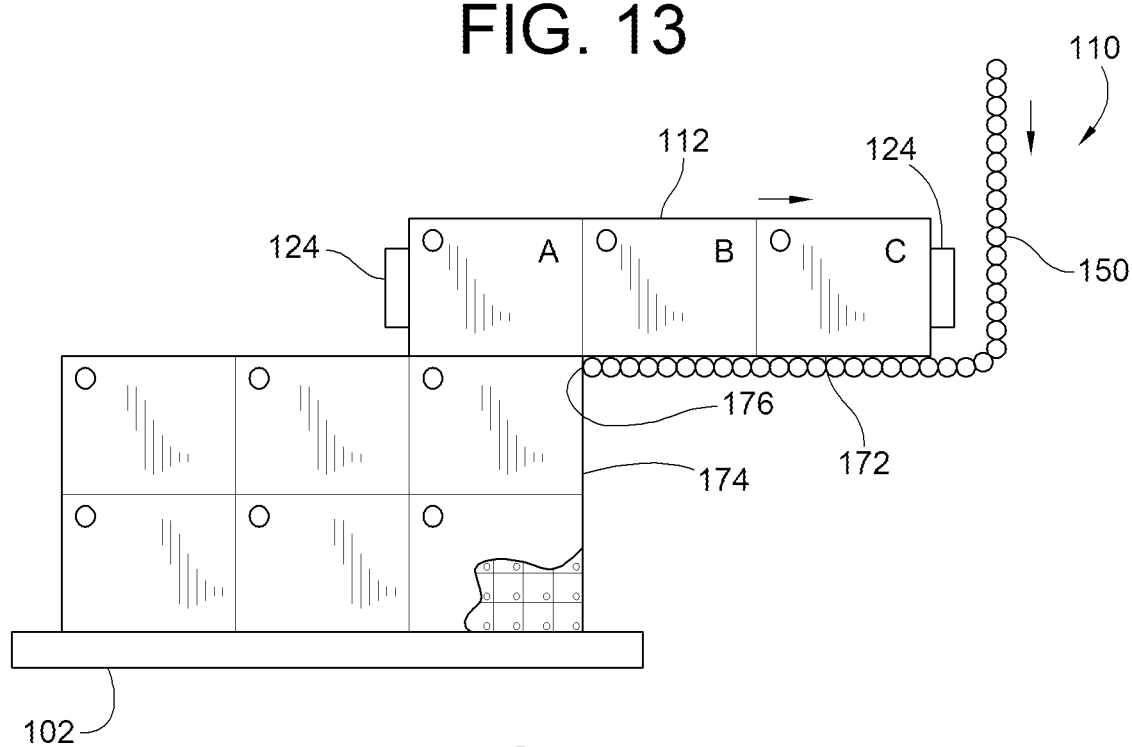
Figure 15:
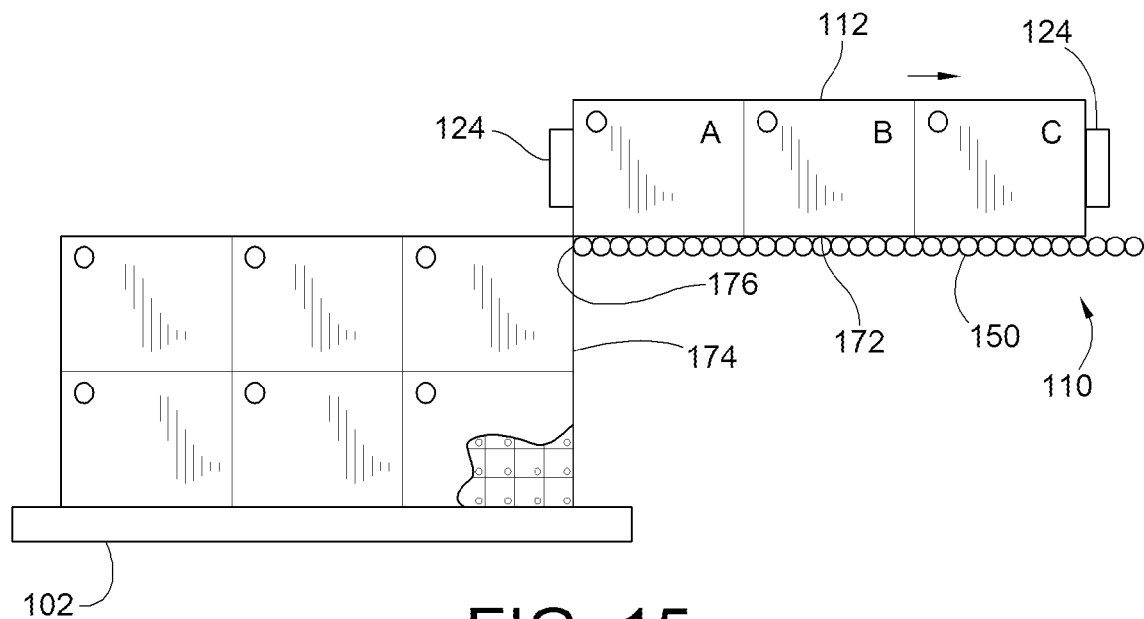

Next, with reference to FIGS. 13-15, the products 112 of the top row are translated laterally off of the top of the stack of products 112. As the end-effector 110 translates the top layer laterally, the rolling floor 150 continues to transition to a fully closed position. However, coordinated movement between rolling floor 150 and the gantry system 106 laterally translating the end-effector 110 and more particularly the frame of the end-effector, maintains the leading edge 176 of the floor 150 proximate side 174 of the second layer. As the products 112 are translated laterally off of the stack of products, the bottoms 172 of the products 112 preferably contact and ride over the top of the rolling floor 150. The inclusion of the rolling shell or rolling elements facilitate smooth movement of the products relative to the rolling floor 150 when the products 112 are supported by rolling floor 150.

Once fully translated laterally off of the stack, the end-effector 110 can transport the products 112 to the desired location. Again, dispensing and releasing the products 112 is just the reverse process.

Further methods of picking products permits picking less than a full layer of products 112, such as a single row of products 12. This process is much like the previous process of picking a layer of products by translating the products laterally off of the stack of products. This process will be described with reference to FIGS. 11-13 and 16-18.

This process begins like the previous process. The end-effector 110 is vertically aligned with the top layer of products 112 and the clamping plates 124 are moved laterally inward to engage (i.e. grasp) the products 112 (See FIG. 11). Next, in one implementation, the rolling floor 150 begins its transition to the down position prior to lifting the products 112. The rolling floor 150 is preferably positioned just below the bottoms 172 of the products 112 of the top layer and against the side 174 of the outer row of the second layer of products 112 (See FIG. 12). Next, the desired number of rows of products 112 are translated laterally off of the top of the stack of products 112. As the end-effector 110 translates the top layer laterally, the rolling floor 150 continues to transition toward the fully closed position. Again, coordinated movement of the end-effector 110 and rolling floor 150 maintains the leading edge 176 of the rolling floor 150 proximate side 174 of the second layer (See FIG. 13). In this operation, as the products 112 are translated off of the stack, the bottom 172 of the products 112 rest on the top of the rolling floor 150. The rolling elements of the rolling floor segments allow the products 112 to easily roll across the top of the rolling floor 150.

Figure 16:
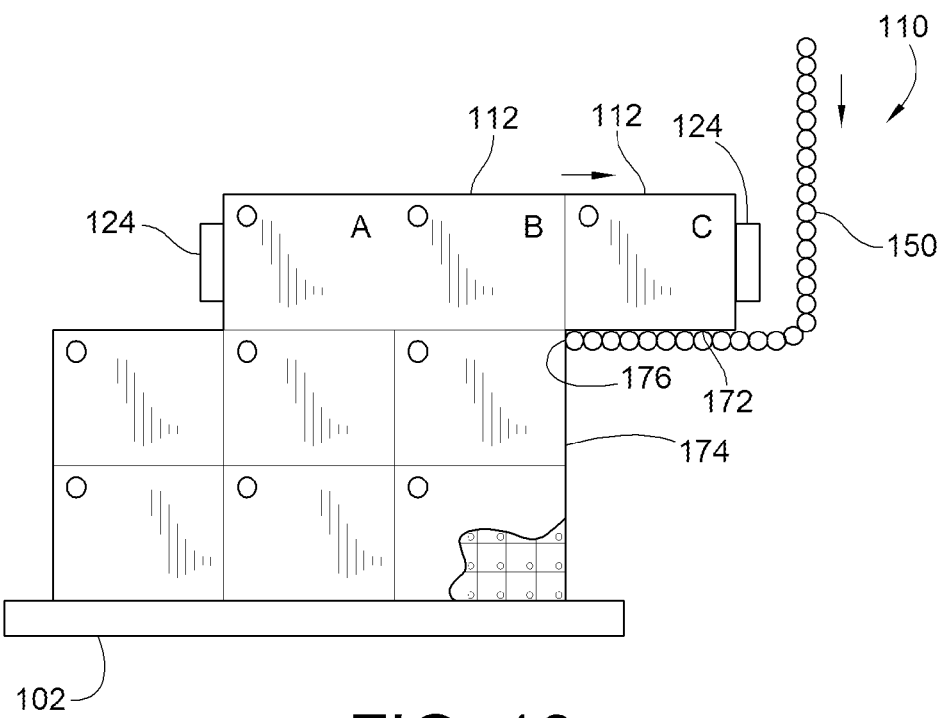

Once the desired number of rows of products of the layer are translated off of the stack of products, one row for this example, the clamping plates 124 are moved laterally outward to disengage or un-grasp the products 112 (See FIG. 16). In this example, a single row of products 112 is now fully supported by the rolling floor 150. The other two rows of the layer (i.e. un-picked products) remain supported by the lower layers of products 112 left on the pallet 102.

Figure 17:
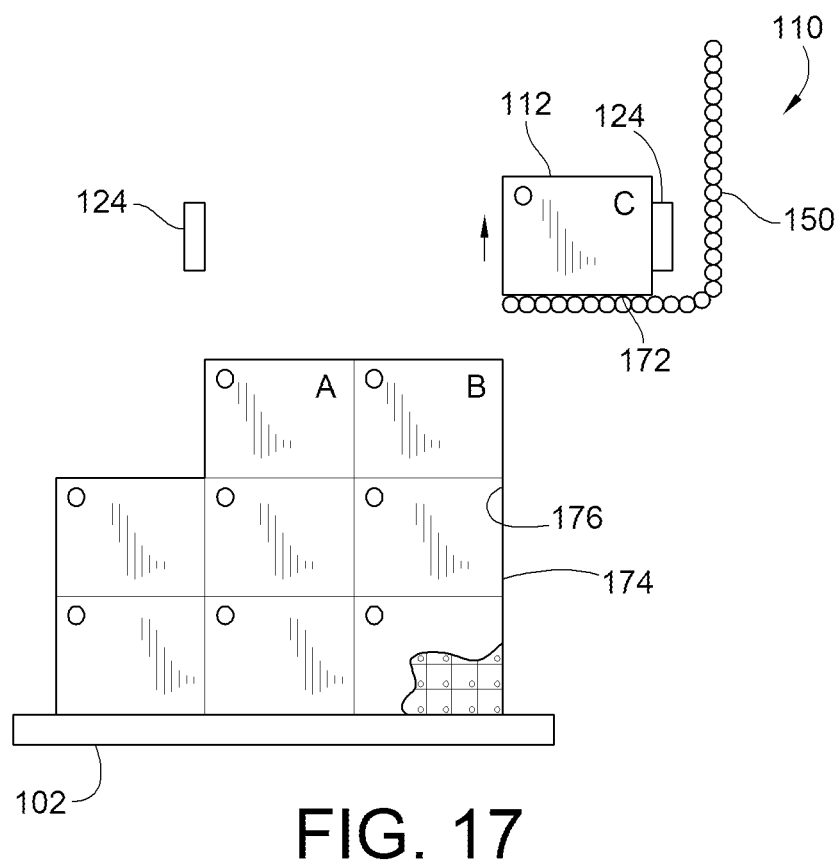
Figure 18:
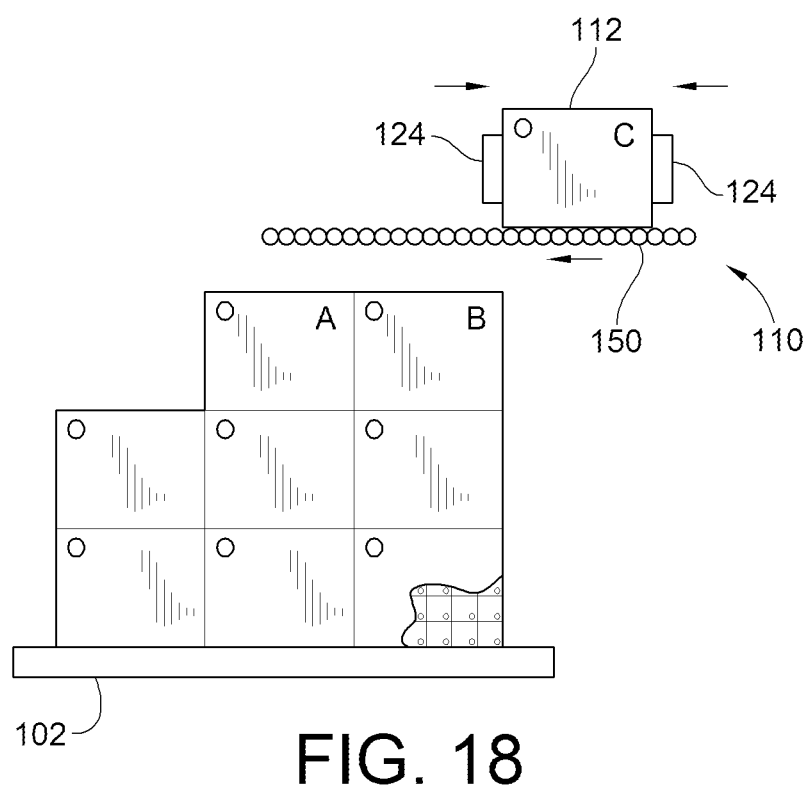

Next, the end-effector 110 is lifted vertically such that at least the clamping plates 124, and preferably the entire end-effector 110, is clear of the un-picked products that remain on pallet 102 (See FIG. 17). Once clear of the un-picked products remaining on pallet 102, the clamping plates 124 optionally move laterally inward and toward one another and engage products 112 that are supported by the rolling floor 150 (See FIG. 18). Optionally, as illustrated in FIG. 18, the rolling floor 150 may also be transitioned to the fully down position. Alternatively, the rolling floor 150 may remain in the partially down and partially up position illustrated in FIG. 17.

While not illustrated, an alternative method of picking less than a full layer of products can be performed with products that are not too loose to be picked as a full layer. It is similar to the previous method, except as detailed below.

Rather than transitioning the products laterally off of the stack of products, the entire layer is first lifted off of the stack. Next, the rolling floor 150 transitions to the partially down and partially up position such that the rolling floor 150 is positioned below the desired number of rows of products. Next, the end-effector translates laterally so that only the products that do not have the rolling floor 150 positioned therebelow ("un-picked products") are positioned above the stack of product that remain on the pallet 102. The end-effector is again lowered and the un-picked products are set back on top of the products that remained on the pallet 102. The clamping plates 124 are transitioned laterally outward and the un-picked products are released back onto pallet 102. Next, the end-effector 110 and the picked row of products are lifted such that the clamping plates are vertically clear of the un-picked products. The clamping plates 124 are then optionally transitioned laterally inward to clamp (i.e. grasp) the picked products that were being supported by the rolling floor 150. The end-effector 110 may now translate the picked products to the desired location. Optionally, once clamped, the rolling floor 150 may remain in the partially up and partially down position or transition to the fully down position.

Figure 19:
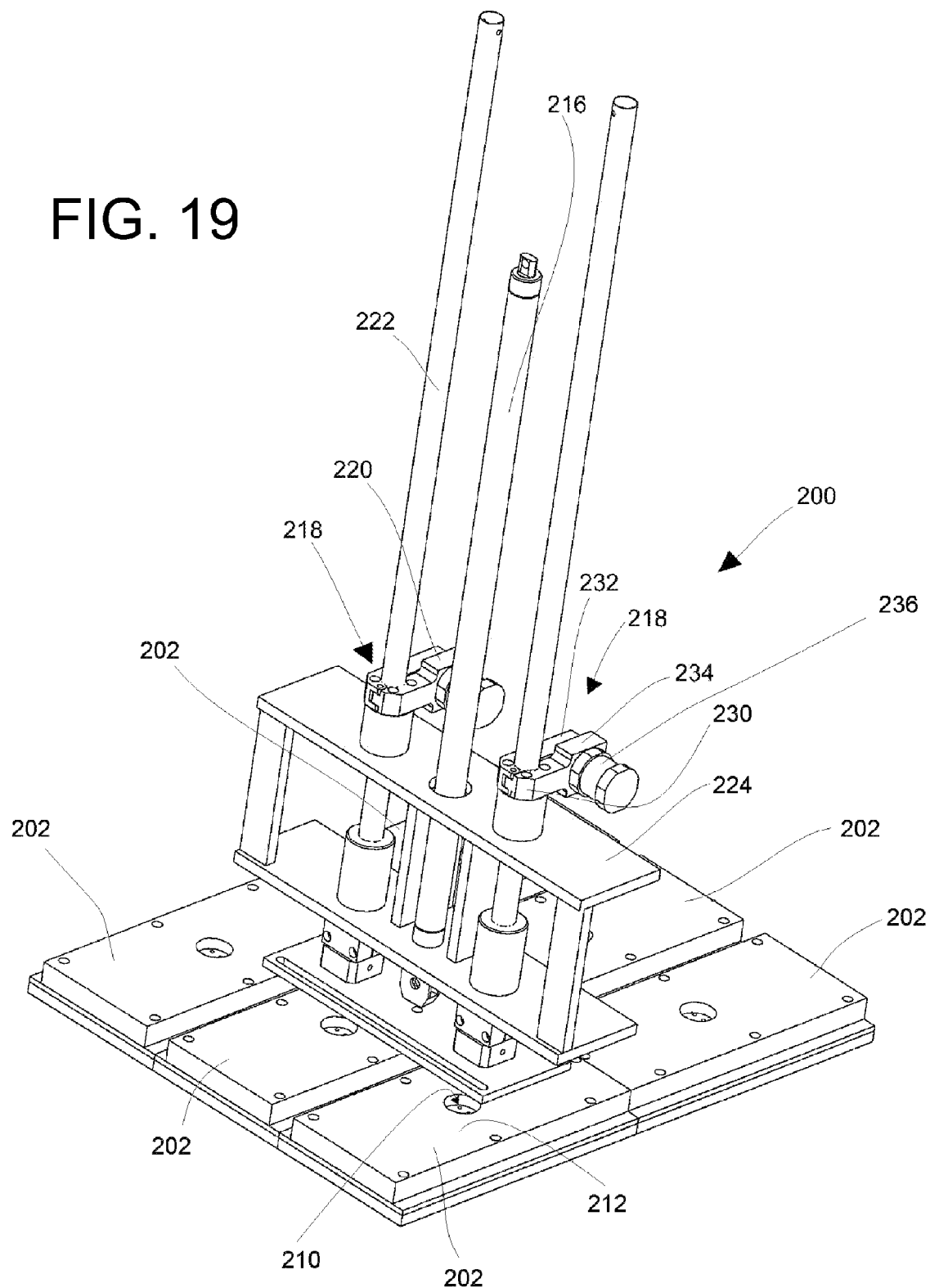
FIGS. 19 and 20 are perspective top and bottom illustrations of a vacuum pad assembly for end-effector of FIG. 1.
Figure 20:
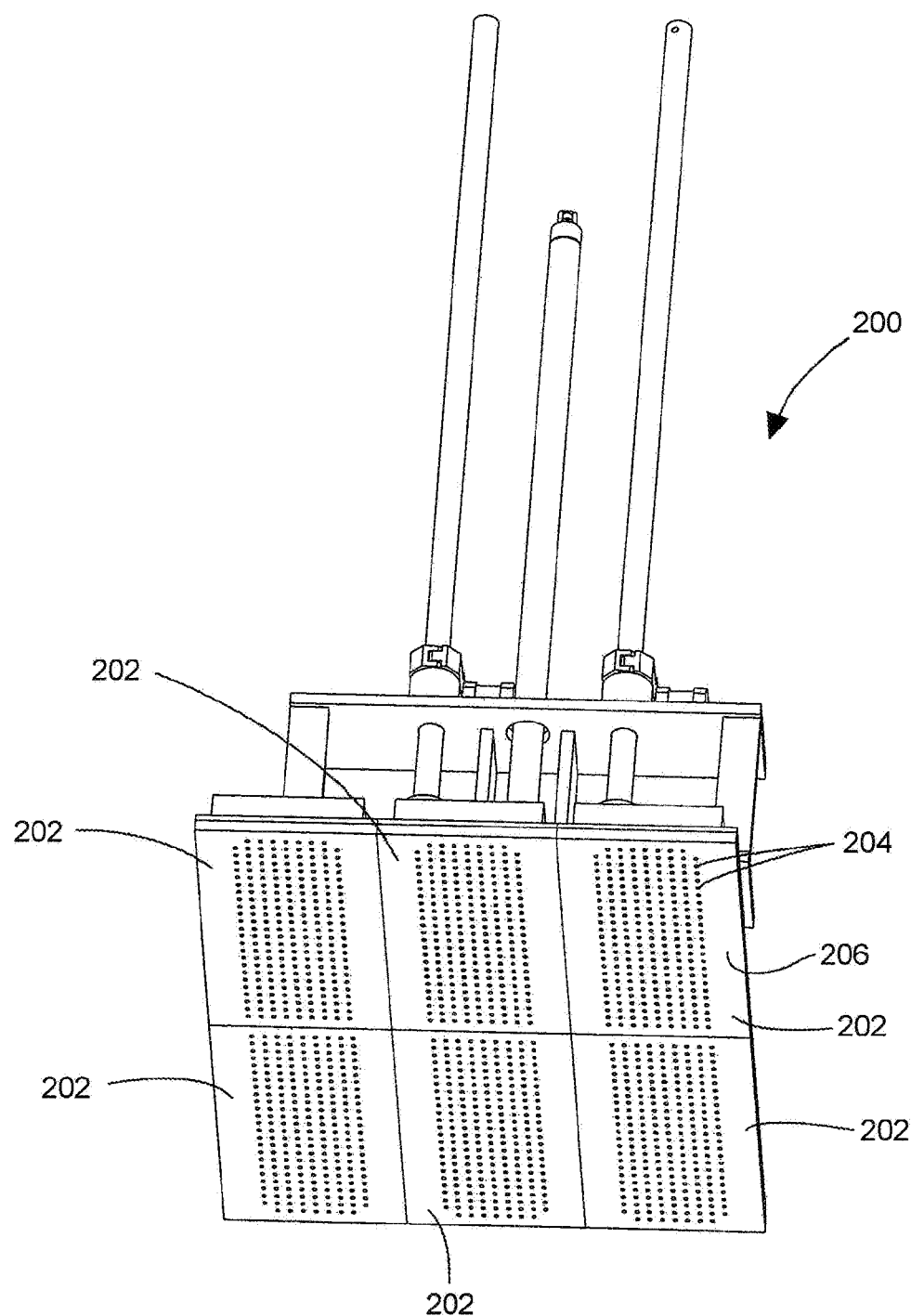

FIGS. 19 and 20 partially illustrate an optional vacuum pad assembly 200 for the end-effector 110 of FIG. 2. The vacuum pad assembly 200 can be used to support or pick various ones of the products from a pallet 102. The vacuum pad assembly 200 finds particular utility when the shape of the products are tapered such that use of clamping plates 124 causes the products 112 to tip when being pressed together during grasping by clamping plates 124. For example, when picking products that are frusto-conical or truncated pyramids in shape, the vacuum pad assembly 200 can be used to engage the flat top of the products 112 by suction forces (also referred to as vacuum adhering or vacuum forces). As the suction forces are being applied to the top of the products 112, the forces are typically generally aligned with gravity.

The vacuum pad assembly 200 can be mounted to the frame structure 120 such that it moves with the end-effector 110 as the end effector 110 is positioned relative to a pallet 102. The vacuum pad assembly 200 is typically secured to frame structure 120. However, the vacuum pad assembly is preferably mounted to the frame structure 120 for movement relative thereto. Thus, the vacuum pad assembly 200 can be moved vertically relative to frame structure 120 depending on the number of layers of product 112 that are being picked. Similarly, the vacuum pad assembly 200 can be moved laterally relative to frame structure 120 along both the X and Y axes (see FIG. 1) to position the vacuum pad assembly 200 over the desired number of products 112 depending on the number of rows of product that are to be picked.

The vacuum pad assembly 200 of the illustrated embodiment includes six vacuum pads 202 that are substantially identical to one another. However, other numbers of vacuum pads 202 can be used. The vacuum pads 202 include a plurality of apertures 204 in a bottom 206 (see FIG. 20) through which a vacuum can be created to vacuum adhere (also referred to as suction) to the top of products 112 on a pallet 102. The use of the vacuum or suction allows the vacuum pads to grasp the tops of the products 112. The surface of the bottom 206 defines a vacuum surface, i.e. a surface that can seal against a surface of a product, that faces floor 150 when the floor 150 is in the closed position. The vacuum adhering occurs on a top side of the products 112.

A suction cavity is formed within each vacuum pad 202 that effectively acts as a manifold and communicates a common vacuum condition to each aperture 204. The vacuum pad 202 also includes a suction port 210 formed though a top 212 that provides access to the suction cavity through which an external vacuum or suction device (not shown) can be operably coupled to the suction cavity. Typically, the vacuum or suction device will be coupled to the suction cavity via flexible tubing that is operably coupled to suction port 210. The use of flexible tubing facilitates movement of the vacuum pad assembly 200 relative to frame structure 120.

Desirably, but not mandatory, the suction or vacuum of each vacuum pad 202 can be controlled independently so that a different number of products can be vacuum adhered to the vacuum pad assembly 200.

The vacuum pad assembly 200 includes a linear actuator 216 for moving the vacuum pads 202 vertically relative to frame structure 120. The vacuum pad assembly 200 may further include load cells or optical sensors for assisting in controlling the movement of the vacuum pads 202 toward and into engagement with products 112 as the vacuum pad assembly 200 grasps, by vacuum adhering or suction forces, the products.

The vacuum pad assembly 200 further includes a pair of locking assemblies 218 that can be used to provide an absolute lock of the vertical position of the vacuum pads 202. The use of the locking assemblies 218 can be advantageous during transport of products 112 so as to prevent inadvertent vertical displacement of the vacuum pads 202.

The vacuum locking assemblies 218 include a clamping mechanism 220 and a vertical slide 222. The vertical slide 222 move axially relative to clamping mechanism 220. When the linear actuator 216 positions the vacuum pads 202 in the desired vertical position, the clamping mechanisms 220 will clamp around vertical slides 222 and prevent the vertical slides 222, and consequently vacuum pads 202, from moving axially relative to frame 224.

The clamping mechanism 220 includes a hinged clamp portion 230 that includes two jaw portions 232, 234 that hingedly pivot toward and away from one another to clamp onto vertical slide 222. The clamping mechanism 220 further includes a drive actuator 236 that drives the jaw portions 232, 234 toward and away from one another to release or engage vertical slide 222.

During initial alignment of the end-effector 110 relative to a pallet of products, the clamping mechanisms 220 and slides 222 allow the vacuum pad assembly 200 to accommodate different product/pallet heights. In other words, the clamping mechanisms 220 in combination with the slides 222 allow the vacuum pad assembly to move vertically to adjust for different vertical positions. More particularly, in some implementations, when the end-effector 110 is being initially vertically aligned with the pallet of products, the vacuum pad assembly 200 would be positioned in a down orientation (i.e. where the vacuum pads 202 would be positioned vertically proximate the clamping plates 124). As the end-effector 110 is lowered vertically down over the products, the vacuum pads 202 will contact the top layer of products. As the end-effector 110 is further lowered, the vacuum pads 202 will remain in contact with the top layer of products, but the slides 222 will slide relative to the clamping mechanisms such that no, or limited, vertical pressure is applied to the products while the end-effector 110 is further lowered. In other words, the vacuum pads 202 will be allowed to "float" relative to the rest of the end-effector 110.

Alternatively, if the vacuum pads 202 were in a fixed vertical orientation relative to the rest of the end-effector 110, as the rest of the end-effector 110 is lowered, such as to vertically orient the clamping plates 124 relative to the desired layer of products, the vacuum pads 202 could attempt push the upper layers of product through bottom layers of products resulting in damage to the various products on the pallet.

For example, if it is desired to pick four layers of product, in one implementation and operation of the end-effector 110, the vacuum pads 202 are positioned vertically proximate clamping plates 124 prior to picking any of the products. As the end-effector 110 is lowered over the products, the vacuum pads 202 will contact the top layer of products. However, the clamping plates 124 need to be lowered down to the fourth layer. As the end-effector 110 continues to move vertically downward, the vacuum pads 202 remain in contact with the top layer of products and provide only limited additional force to the top of the products as the slides 222 slide relative to clamping mechanisms 220 until the end-effector 110 is in its final position for picking the four layers of products. Then, in the desired vertical position, the clamping mechanisms 220 will clamp on the slides 222 preventing the slides 222 from moving vertically relative to frame 224.

Figure 21:
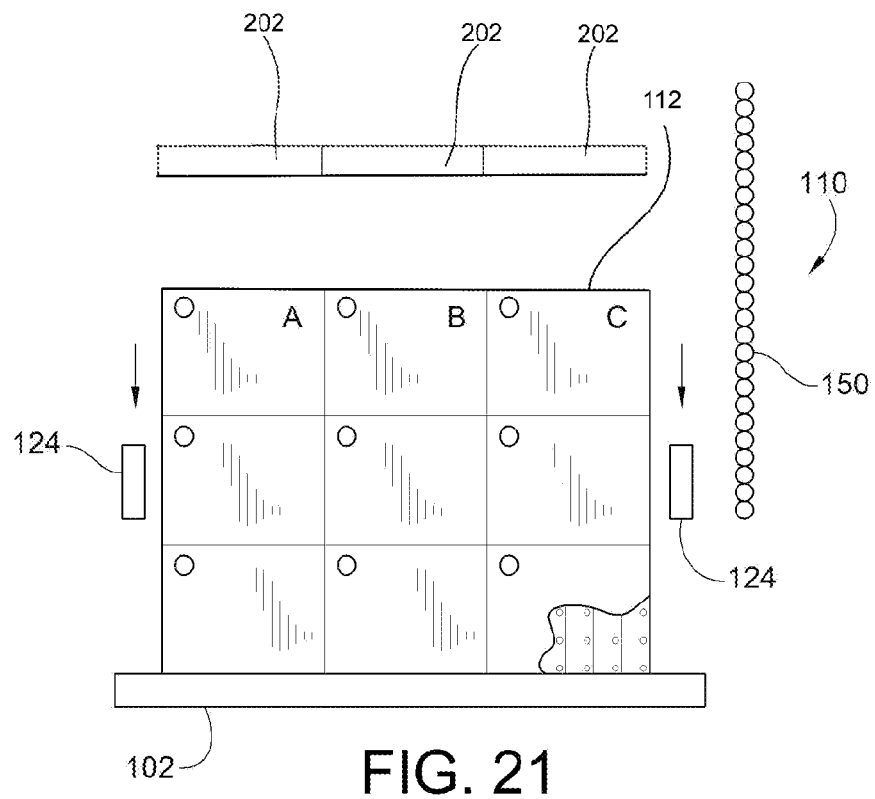
FIGS. 21-24 are schematic representations of the end-effector including the vacuum pad assembly in various positions and orientations as it goes through various processes of picking products from a stack of products on a pallet.

With reference to schematic illustrations FIGS. 21-24, a representative method of operating an end-effector 110 incorporating a vacuum pad assembly 200 to pick products 112 will be described. The method is similar to FIGS. 7-10. In FIG. 21, the end-effector 110 (illustrated throughout FIGS. 21-24 by clamping plates 124, rolling floor 150 and vacuum pads 202) is positioned vertically relative to a pallet 102 so as to pick the top two layers of products 112.

In FIG. 21, the clamping plates 124 are laterally spaced apart and away from products 112. The rolling floor 150 is in the open position (also referred to as the "up position"). The vacuum pads 202 are positioned vertically above the products 112. In this method, the vacuum pads 202 are maintained in an up position by locking mechanisms 218 (not shown in FIG. 21).

Figure 22:
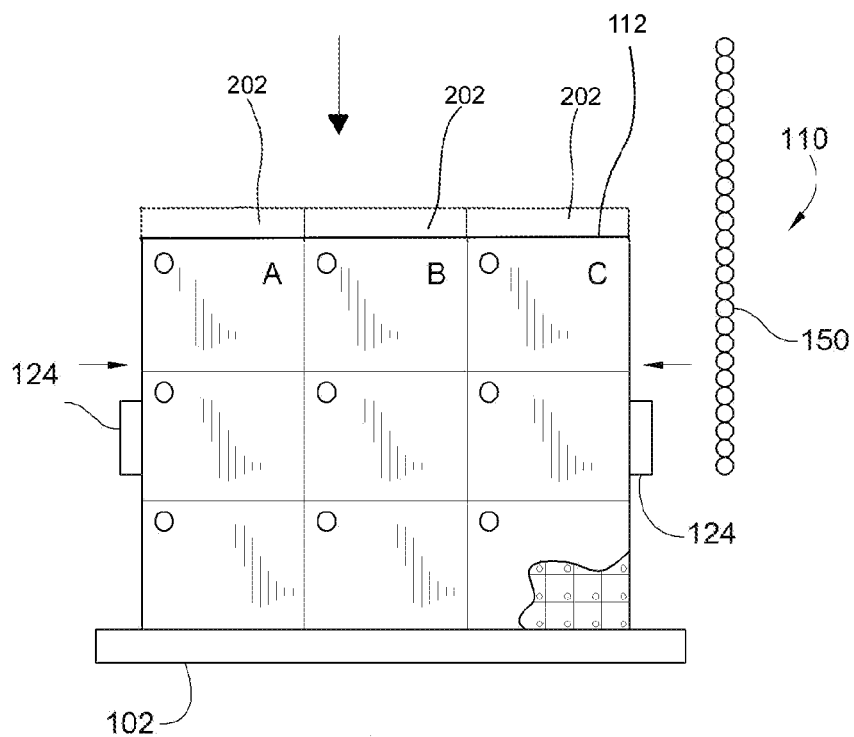

Next, the clamping plates 124 transition toward one another and clamp (i.e. grasp) the second layer of products 112 (See FIG. 22). Additionally, the vacuum pads 202 are moved vertically downward (i.e. by releasing the clamping mechanisms 218) and into contact with the top layer of products 112. With the vacuum pads 202 contacting the top of the top layer of products 112, a vacuum is supplied to the vacuum pads 202 so that the vacuum pads 202 vacuum adhere to the tops of the top layer of products 202.

Figure 23:
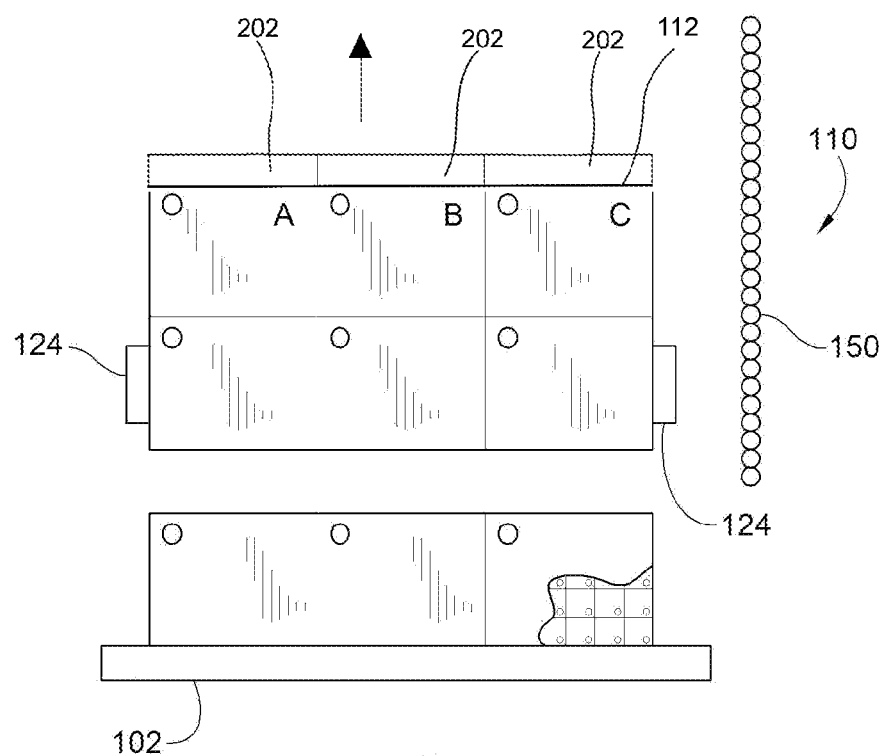

With the clamping plates 124 pressed laterally inward against the products 112 and the vacuum pads 202 vacuum adhered to the top layer of products 112 and in a locked position (i.e. by locking mechanisms 218), the end-effector 110 is actuated vertically upward along the z-axis to lift and remove the top two layers of products 112 (See FIG. 23).

Figure 24:
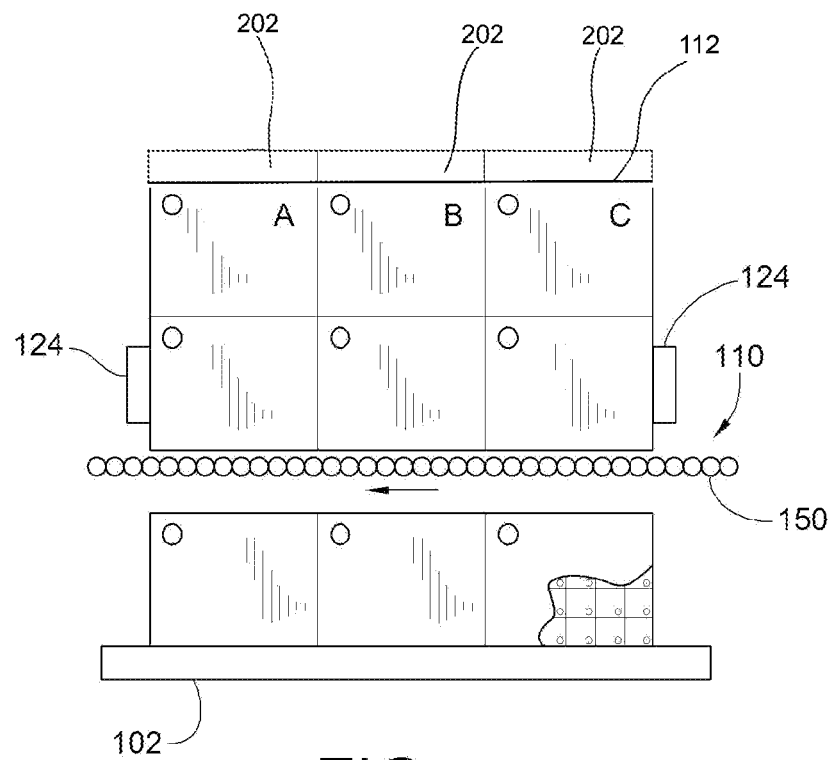

With the end-effector 110 raised to form a gap between the second layer of products and the bottom layer of products, the rolling floor 150 is transitioned to the closed position (also referred to as the "down position") (See FIG. 24). The products may then be moved to the desired location and restacked by repeating the same steps in reverse order. With the rolling floor 150 in the closed position, should any products become loose, they will not fall and be destroyed. Instead, they will remain supported by rolling floor 150.

The use of the vacuum pads 202 can be incorporated into any of the other aforementioned described and illustrated methods of using end-effector 110 to provide additional support of the products 112 during the picking processes. The use of the vacuum pad assembly 200 is particularly useful when using products where the center products of a layer of product want to become loose and fall out, and even more particularly in those situations where only a single layer of product are being picked.

Additionally, the use of a vacuum pad assembly 200 can be helpful in those instances where the end-effector 110 operates to first slide a row of product off of another layer of product before clamping the product with the clamping plates 124 because the use of the vacuum pad assembly 200 can provide a bit of vertical lifting on the products that are being slid to reduce the friction between the two layers of products.

In an alternative method of picking less than a full layer of products 112, not illustrated, the vacuum pad assembly 200 can be positioned into contact with the top layer of products 112 on a pallet 102. Then only a limited number of the vacuum pads 202 may be activated (i.e. supplied with a vacuum) to vacuum adhere to less than the entire layer of products. Next, the end-effector 110 can be moved vertically or laterally (depending on the position of the vacuum adhered, i.e. picked, products) to remove the picked products 112 from the pallet 202. Once sufficiently moved away, i.e. far enough to provide a clearance gap for the rolling floor 150, the rolling floor 150 can be moved under the picked products 112 to provide further support during transport. Further, while not mandatory, the clamping plates 124 can also be moved laterally inward to clamp the picked products 112 therebetween to provide additional support during transport.

As illustrated above, different embodiments and methods of using the vacuum pad assembly 200 can be used to engage the vacuum pads 202 with the top layer of products that are being picked by the end-effector 110. In other words, the vacuum pad assembly 200 can contact the top layer of products prior to the end-effector 110 being positioned in its ultimate vertical position relative to the pallet of products. Alternatively, the vacuum pad assembly 200 can be lowered into engagement with the top layer of products after the end-effector 110 is in its ultimate vertical position relative to the pallet of products.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A robotic system comprising:
    an end-effector including:
        a frame structure;
        a first clamping mechanism having a first product engagement structure, the first clamping mechanism mounted to and movable relative to the frame structure;
        a second product engagement structure movable toward and away from the first product engagement structure along a first axis; and
        a floor moveable relative to the frame structure and the first and second product engagement structures such that the floor selectively closes a vertical opening defined between the first and second product engagement structures; and
    a gantry system coupled to the end-effector and configured to move and support the end-effector in three dimensions.

2. The robotic system of claim 1, including a controller configured to move the end-effector along a first axis while maintaining a position of a leading edge of the floor along the first axis.

3. A method of transporting at least one product of a stack of products having at least a first layer of products and a second layer of products positioned on top of the first layer with a system including an end-effector having a movable floor comprising the steps of:
    removing at least one first product of the second layer of products off of the first layer of products with the end-effector from the stack of products; and
    transitioning the movable floor under the at least one first product;
    grasping the at least one first product with at least one clamping mechanism of the end-effector; and
    transitioning the movable floor out from underneath the at least one product prior to releasing the at least one product from the at least one clamping mechanism.

4. The method of claim 3, wherein the step of removing at least one first product of the second layer of product off of the first layer of products includes laterally translating the entire second layer of products of the stack such that at least one product of the second layer of products, including the at least one first product, is no longer vertically supported by the first layer of products.

5. The method of claim 4, further comprising vertically aligning a top surface of the movable floor with a top of the first layer of products upon which the second layer of products is supported.

6. The method of claim 5, further comprising laterally positioning a leading edge of the movable floor proximate a side of the first layer of products from which the at least one products will be removed, prior to removing at least one product from the second layer of products.

7. The method of claim 4, wherein laterally translating an entire layer of products includes supporting at least one of the products of the second layer of products with the movable floor when it is translated off of the first layer of products.

8. The method of claim 4, wherein the at least one first product that is no longer vertically supported by the first layer of products is initially entirely vertically supported by the movable floor.

9. The method of claim 4, further comprising the step of grasping the at least one first product, the grasping of the at least one first product providing sufficient friction to provide vertical support of the at least one first product.

10. The method of claim 3, wherein the step of grasping occurs before the step of removing, and the step of removing is performed by vertically lifting the at least one first product off of the first layer of products and the step of transitioning occurs after the step of lifting.

11. The method of claim 3, wherein the step of grasping further includes grasping at least one second product that will ultimately remain on the stack after the step of removing is complete, and the step of transitioning excludes transitioning the movable floor under the at least one second product.

12. The method of claim 11, further comprising re-stacking the at least one second product including setting the at least one second product back onto the first layer of products and ungrasping the at least one second product.

13. The method of claim 3, further comprising grasping the product by suction forces using a vacuum pad mechanism defining a vacuum surface facing the floor when the floor is in the closed position.

14. A method of transporting at least one product of a stack of products having at least a first layer of products and a second layer of products positioned on top of the first layer with a system including an end-effector having a movable floor comprising the steps of:
  removing at least one first product of the second layer of products off of the first layer of products with the end-effector from the stack of products; and
  transitioning the movable floor under the at least one first product
  wherein the step of grasping further includes grasping at least one second product that will ultimately remain on the stack after the step of removing is complete, and the step of transitioning excludes transitioning the movable floor under the at least one second product
  further comprising re-stacking the at least one second product including setting the at least one second product back onto the first layer of products and ungrasping the at least one second product;
  further comprising a step of re-grasping the at least one first product which excludes grasping the at least one second product.

* * * * *